United States Patent
Niwa

(10) Patent No.: US 7,074,470 B2
(45) Date of Patent: *Jul. 11, 2006

(54) PROTECTIVE SLEEVE FOR MOTOR COMPONENT

(75) Inventor: Shu Niwa, Osaka (JP)

(73) Assignees: Gosen Co., Ltd., Osaka (JP); Toyota Jidosha Kabushiki Kaisha, Aichi-ken (JP)

(*) Notice: Subject to any disclaimer, the term of this patent is extended or adjusted under 35 U.S.C. 154(b) by 230 days.

This patent is subject to a terminal disclaimer.

(21) Appl. No.: 10/703,902

(22) Filed: Nov. 7, 2003

(65) Prior Publication Data

US 2004/0091655 A1 May 13, 2004

(30) Foreign Application Priority Data

Nov. 12, 2002 (JP) ............................. 2002-328314

(51) Int. Cl.
*D04C 1/12* (2006.01)
*D04C 1/06* (2006.01)
*B32B 1/08* (2006.01)

(52) U.S. Cl. .................. 428/36.3; 87/6; 87/7; 87/8; 87/9; 87/11

(58) Field of Classification Search ............... 428/36.3; 87/9, 6, 7, 8, 11
See application file for complete search history.

(56) References Cited

U.S. PATENT DOCUMENTS

| 4,502,364 A | 3/1985 | Zucker et al. |
| 5,197,370 A * | 3/1993 | Gladfelter .................. 87/7 |
| 5,242,743 A | 9/1993 | Nakanishi et al. |
| 5,876,297 A | 3/1999 | Takeuchi |
| 6,341,550 B1 | 1/2002 | White |
| 2004/0091655 A1 | 5/2004 | Niwa |

FOREIGN PATENT DOCUMENTS

| JP | 6-73649 | 3/1994 |
| JP | 6-335632 | 12/1994 |
| JP | 08-13300 | 1/1996 |
| JP | 10-273825 | 10/1998 |
| JP | 11-093028 | 4/1999 |
| JP | 11-279880 | 10/1999 |
| JP | 2001-123324 | 5/2001 |
| JP | 2001-248075 | 9/2001 |

* cited by examiner

*Primary Examiner*—William P. Watkins, III
(74) *Attorney, Agent, or Firm*—Hamre, Schumann, Mueller & Larson, P.C.

(57) ABSTRACT

A protective sleeve for a motor component includes a cylindrical-shaped braided cord of twenty-four or more strands using both a multifilament strand and a monofilament strand made of synthetic fibers having a melting point or a decomposition temperature at 280° C. or more. The protective sleeve has oil resistance at high temperatures of 50% or more, the oil resistance at high temperatures being represented by the following formula: oil resistance at high temperatures (%)=(T'/T)×100. Here, T denotes a tensile strength of the protective sleeve before a treatment and T' denotes a tensile strength of the protective sleeve after the treatment. The tensile strength is measured in accordance with JIS L1013-8.5.1, and the treatment is carried out in such a manner that the entire protective sleeve is put into a closed container containing a mixture of 5 weight % of water and 95 weight % of automatic transmission fluid, followed by heating the container so that a temperature of the mixture is maintained at 150° C. for 1,000 hours.

15 Claims, 2 Drawing Sheets

PROTECTIVE SLEEVE FOR MOTOR COMPONENT

BACKGROUND OF THE INVENTION

1. Field of the Invention

The present invention relates to a protective sleeve for a motor component.

2. Related Background Art

Conventionally, it has been demanded to combine a decrease in hazardous substances contained in the exhaust gas emitted from vehicles and an increase in gas mileage. In recent years, there has been a further request for reducing a load on the environment globally. Against this background, research and development of electric vehicles have been carried out vigorously. Electric vehicles currently being developed include: a pure electric vehicle (PEV) equipped with a high-capacitance secondary battery; a hybrid electric vehicle (HEV) in which a gasoline engine and a high power secondary battery are combined; a fuel-cell hybrid electric vehicle (FCHEV) in which a fuel cell and a high power secondary battery are combined and the like. In any case, a high-efficiency motor has to be developed. As such a motor, there are motors for driving and for generating and charging electric power. It has been strongly demanded to stabilize the qualities of these motors in terms of the traveling stability, in addition to the high efficiency. Especially in the case of an electric vehicle motor, it is required to have excellent oil resistance at high temperatures as compared with a motor for normal vehicles. In order to enhance the efficiency, an electric vehicle motor has to be exposed to ATF (automatic transmission fluid). Since the ATF reaches a high temperature in some cases, the motor is required to have resistance to high temperatures in the AFT. In addition to that, there has been a demand for the development of a material used for a component of the motor so as to have homogenous performance.

Conventionally, the use of a multifilament insulating material has polyphenylene sulfide (PPS) fibers as an electrical insulating material has been proposed (See JP H08 (1996)-13300 A, JP H10(1998)-273825 A and JP 2001-248075 A). Also, JP 2001-123324 A proposes that a protective sleeve is manufactured using a monofilament strand made of a PPS fiber.

SUMMARY OF THE INVENTION

The above-described protective sleeve for a motor component that is manufactured using the multifilament strand has excellent oil resistance at high temperatures, but has a problem with the insertion capability of a component. That is to say, the protective sleeve is so flexible that it assumes an oblate form. Therefore, it is difficult to insert a component therein without the use of a jig in a cap form, which inhibits the automation for inserting a component. In addition, the above-described protective sleeve for a motor component that is manufactured using the monofilament strand is inferior in oil resistance at high temperatures. Even when varnish is applied to the protective sleeve for the purpose of enhancing the oil resistance at high temperatures, there are problems that the penetration of the varnish into the protective sleeve and the durability of the varnish are extremely low.

Therefore, in order to cope with the above-stated conventional problems, it is an object of the present invention to provide a protective sleeve for a motor component with which a component can be inserted without the use of a jig and that has oil resistance at high temperatures.

In order to fulfill the above-stated object, a protective sleeve for a motor component of the present invention includes a cylindrical-shaped braided cord of twenty-four or more strands that include both a multifilament strand and a monofilament strand made of synthetic fibers having a melting point or a decomposition temperature of 280° C. or more. The protective sleeve has oil resistance at high temperatures of 50% or more, and the oil resistance at high temperatures is represented by the following formula:

oil resistance at high temperatures (%)=(T'/T)=100.

where T denotes a tensile strength of the protective sleeve before a treatment and T' denotes a tensile strength of the protective sleeve after the treatment.

Here, the tensile strength is measured in accordance with JIS L1013-8.5.1, and the treatment is carried out in such a manner that the entire protective sleeve is put into a closed container containing a mixture of 5 weight % of water and 95 weight % of automatic transmission fluid, followed by heating the container so that a temperature of the mixture is maintained at 150° C. for 1,000 hours.

The oil resistance at high temperatures relates to the comparison of tensile strength between before and after the high temperature treatment in oil. A value closer to 100% of this means that the tensile strength of the protective sleeve does not change even after the high temperature treatment applied to the protective sleeve, that is, the protective sleeve has excellent oil resistance at high temperatures.

In addition, since the high temperature treatment is carried out in a mixture of automatic transmission fluid and water, the above-stated high oil resistance at high temperatures means that the protective sleeve has resistance against hydrolytic degradation as well.

DETAILED DESCRIPTION OF THE INVENTION

Figure 1:
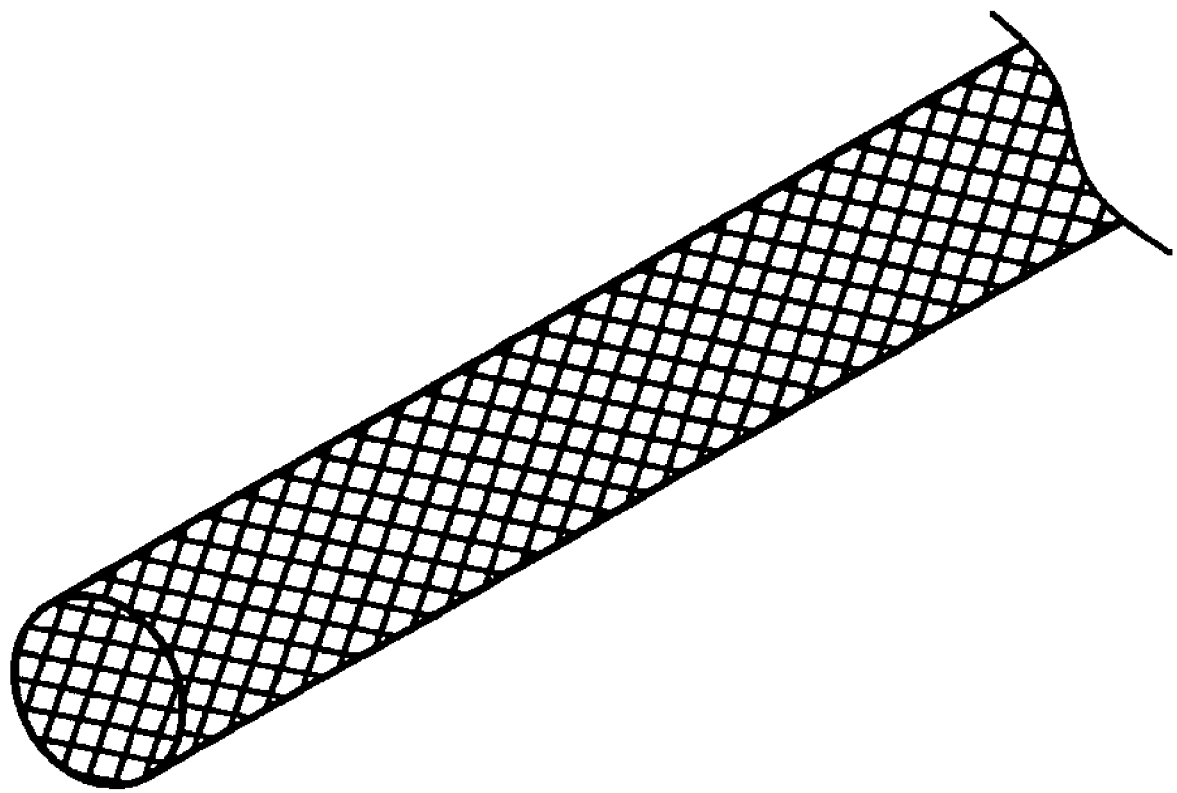
FIG. 1 shows the appearance of a protective sleeve for a motor component that is obtained in Example 1 of the present invention.

A protective sleeve for a motor component of the present invention has excellent oil resistance at high temperatures, and can accept insertion of a component without the use of a jig.

Motor components that can be associated with the protective sleeve for a motor component of the present invention include components making up the motor such as a coil, a wire and a binding cord. The protective sleeve for a motor component of the present invention is a cylindrical-shaped sleeve for covering such motor components so as to protect the same, and a preferable one is for protecting a coil. As the motor, there are a motor for vehicles, a motor for household electrical applicances such as an air conditioner and a refrigerator, a motor for motive power and the like, and a preferable one is a motor for vehicles. As the motor for vehicles, there are a motor for electric vehicles, a motor for gasoline-powered vehicles, a motor for diesel engine vehicles and the like, and a preferable one is a motor for electric vehicles.

The protective sleeve for a motor component of the present invention can be used for manufacturing the motor, for example, so as to cover the motor component to protect the same. In addition, by covering a motor component with the protective sleeve for a motor component of the present invention, the motor component can be protected.

The melting point or the decomposition temperature of the synthetic fibers of the multifilament strand is not less than 280° C., and preferably not less than 283° C.

The melting point or the decomposition temperature of the synthetic fiber of the monofilament strand is not less than 280° C., and preferably not less than 283° C.

The braided cord includes twenty-four or more strands. The braided cord of twenty-four or more strands can make an inner diameter of the braided cord large, and therefore a motor component with a large size can be covered with the protective sleeve. The braided cord preferably includes twenty-four to ninety-six strands, inclusive, and more preferably includes forty-eight to sixty-four strands, inclusive.

The oil resistance at high temperatures of the protective sleeve is 50% or more, and 55% or more is preferably, which can provide a motor for an electric vehicle capable of traveling stably for a long time.

The compressive modulus of the protective sleeve measured in accordance with JIS L 1096 preferably ranges from 65% to 95%, inclusive. In the case of the compressive modulus of 65% or more, the protective sleeve is not so soft that it can maintain a favorable cylindrical shape. In addition, when a force is applied thereto, the protective sleeve assumes an oblate form, and when the force is removed, the protective sleeve returns to the original form. Therefore, a component can be inserted into the protective sleeve easily. In the case of the compressive modulus of 95% or less, the protective sleeve is not so stiff and the penetration capability and durability of a varnish coating can be improved. The compressive modulus more preferably ranges from 70% to 90%, inclusive.

The above-described synthetic fibers for the multifilament strand having the melting point or the thermal decomposition temperature of 280° C. or more preferably are a polyphenylene sulfide fiber or an aramid fiber. These fibers can provide high oil resistance at high temperatures for the protective sleeve. The synthetic fibers having the melting point or the thermal decomposition temperature of 283° C. or more include a polyphenylene sulfide fiber or an aramid fiber.

Similarly, the above-described synthetic fiber for the monofilament strand having the melting point or the thermal decomposition temperature of 280° C. or more preferably is a polyphenylene sulfide fiber or an aramid fiber. These fibers can provide high oil resistance at high temperatures for the protective sleeve. The synthetic fiber having the melting point or the thermal decomposition temperature of 283° C. or more includes a polyphenylene sulfide fiber or an aramid fiber.

The aramid fiber includes para-aramid fibers and meta-aramid fibers, and the latter meta-aramid fibers are preferable. The synthetic fibers for the multifilament strand and the synthetic fiber for the monofilament strand may be of the same or different type.

Preferably, the protective sleeve further is subjected to a treatment of sticking the protective sleeve continuously with a rod-shaped jig so as to assume the cylindrical shape. The protective sleeve subjected to such a treatment is not crushed to be an oblate form, and therefore a motor component can be inserted into the protective sleeve easily without the use of a special jig. For example, such a treatment may be carried out by, immediately after the braiding by a braider using strands wound on small bobbins, sticking the protective sleeve from directly below with a round iron rod with a tip end rounded so as to correspond to an inner diameter of the cord.

A thickness of the multifilament strand preferably ranges from 150 dtex to 900 dtex, inclusive. This range can allow an insertion operation of a component into the protective sleeve to be conducted smoothly. The thickness of the multifilament strand more preferably ranges from 150 dtex to 500 dtex, inclusive, and further preferably ranges from 200 dtex to 400 dtex, inclusive.

A thickness of the monofilament strand preferably ranges from 0.1 mm to 0.5 mm, inclusive, in diameter. This range can allow an insertion operation of a component into the protective sleeve to be conducted smoothly. The thickness of the monofilament strand more preferably ranges from 0.15 mm to 0.40 mm, inclusive, in diameter and further preferably ranges from 0.20 mm to 0.35 mm, inclusive, in diameter.

A weight of the protective sleeve per meter preferably ranges from 2.0 g to 10.0 g, inclusive. This range can allow an insertion operation of a component into the protective sleeve to be conducted smoothly. The weight of the protective sleeve per meter more preferably ranges from 3.0 to 7.0 g inclusive and further preferably ranges from 4.0 to 6.0 g, inclusive.

The protective sleeve preferably includes the cord that is braided so that the multifilament strand (A) and the monofilament strand (B) are used together at a weight ration of (A):(B)=20:80 to 80:20. This range can realize the protective sleeve that is further preferably braided in a cylindrical shape. As a result, a component can be inserted into the protective sleeve for a motor component of the present invention without the use of a jig. In addition, the above-stated range can provide the protective sleeve with a high penetration and high durability varnish coating and with excellent oil resistance at high temperatures. The protective sleeve more preferably includes the cord that is braided so that the multifilament strand (A) and the monofilament strand (B) are used together at a weight ratio of (A):(B)=25:75 to 75:25.

The protective sleeve preferably includes the cord that is braided using together the multifilament strand and the monofilament strand that are supplied separately. When the cord is braided with the multifilament strand only, the protective sleeve becomes too soft, whereas when the cord is braided with the monofilament strand only, the protective sleeve becomes too stiff. However, when the cord is braided by supplying both of the filaments separately, the protective sleeve with a preferable stiffness (i.e., compressive modulus) can be obtained. When a thin filament strand is used as the multifilament strand, it is preferable that two or more strands are supplied to a braider while being pulled parallel.

Preferably, the protective sleeve further is subjected to a varnish treatment. When the varnish is applied to the protective sleeve, an insulating capability of the protective sleeve can be enhanced, and resistance against various mechanical stress can be improved. The varnish treatment may be conducted after the insertion of a motor component to be protected into the protective sleeve or before the insertion, and it is preferable to conduct the treatment after the insertion, which can improve the workability of the insertion operation. The varnish treatment can be conducted, for example, by applying the varnish to the protective sleeve by spraying, dropping or brushing after the insertion of a motor component into the protective sleeve, followed by drying and curing.

The protective sleeve for a motor component of the present invention may be different depending on a type of a motor or a component to which the protective sleeve is applied, and is not limited especially. However, generally, it has an inner diameter of about 5 to 9 mm and a length of about 5 to 40 cm, for example. In the case of the application for an electric vehicle, the protective sleeve has an inner diameter of about 6 to 7 mm and a length of about 5 to 40 cm, for example.

For example, a preferable protective sleeve for a motor component includes a cylindrical-shaped braided cord of twenty-four or more strands using together a multifilament strand and a monofilament strand. The multifilament strand of 150 dtex to 900 dtex, inclusive, is made of synthetic fibers having a melting point or a decomposition temperature of 280° C. or more, and the monofilament strand of 0.1 mm to 0.5 mm, inclusive, in diameter is made of a synthetic fiber having a melting point or a decomposition temperature of 280° C. or more, where the multifilament strand and the monofilament strand are used together at a weight ratio of 20:80 to 80:20, and the protective sleeve is subjected to a treatment of sticking the protective sleeve continuously with a rod-shaped jig so as to assume the cylindrical shape. It is preferable that the protective sleeve further is subjected to a varnish treatment.

A more preferable protective sleeve for a motor component includes a cylindrical-shaped braided cord of thirty-two or fifty-six strands using together a multifilament strand and a monofilament strand. The multifilament strand of 150 dtex to 500 dtex, inclusive, is made of PPS fibers or aramid fibers, and the monofilament strand of 0.15 mm to 0.35 mm, inclusive, in diameter is made of a PPS fiber, where the multifilament strand and the monofilament strand are used together at a weight ratio of 20:80 to 80:20, preferably 25:75 to 75:25, and the protective sleeve is subjected to a treatment of sticking the protective sleeve continuously with a rod-shaped jig so as to assume the cylindrical shape. It is preferable that the protective sleeve further is subjected to a varnish treatment.

A further preferable protective sleeve for a motor component includes a cylindrical-shaped braided cord at forty-eight to sixty-four strands, inclusive, using together a multifilament strand and a monofilament strand. The multifilament strand of 150 dtex to 500 dtex, inclusive, is made of PPS fibers or aramid fibers, and the monofilament strand of 0.15 mm to 0.35 mm, inclusive, in diameter is made of a PPS fiber, where the multifilament strand and the monofilament strand are used together at a weight ratio of 20:80 to 80:20, preferably 25:75 to 75:25, and the protective sleeve is subjected to a treatment of sticking the protective sleeve continuously with a rod-shaped jig so as to assume the cylindrical shape. It is preferable that the protective sleeve further is subjected to a varnish treatment.

EXAMPLES

The following further describes the present invention in detail, with reference to the not-limiting examples and comparative examples. In the following examples and comparative examples, melting points or decomposition temperatures, oil resistance at high temperatures and compressive modulus of a protective sleeve for a motor component were measured as follows:

(1) Melting point or decomposition temperature: a specimen was heated together with a reference substance by a DSC (differential scanning calorimetry) method at an increasing rate of 10° C./min, whereby a temperature of melting or decomposition was measured.

(2) Oil resistance at high temperatures: the entire protective sleeve with a length of 60 cm was put into a closed container containing a mixture (5 liter) of 5 weight % of water and 95 weight % of automatic transmission fluid (ATS WS (trade name) made by Esso Sekiyu K. K. ). Then, the container was heated so as to maintain the temperature of the mixture in the container at 150° C. for 1,000 hours. A tensile strength (T) of the protective sleeve before such a treatment and a tensile strength (T') of the protective sleeve after the treatment were measured in conformance with JIS L1013-8.5.1. The thus obtained tensile strength were introduced into the following formula so as to determine the oil resistance at high temperatures. An average of the values obtained by the measurement conducted five times was calculated. Note here that in this measurement any AFT can be used as the AFT.

Oil resistance at high temperatures (%)=(T'/T)×100 where T denotes a tensile strength before the treatment and T' denotes a tensile strength after the treatment.

(3) Compressive modulus of a protective sleeve for a motor component: compressive modulus was determined in conformance with JIS L 1096. More specifically, in a state where a protective sleeve was allowed to stand still so that a sleeve wall of the protective sleeve faces downward, a thickness (T0) (mm) of the protective sleeve was measured under a standard pressure of 4.9 kPa. Thereafter, the protective sleeve was allowed to stand for one minute under a constant pressure of 29.4 kPa, and then a thickness of the protective sleeve (T1) under the pressure was measured. Next, after the applied pressure was released and the protective sleeve was allowed to stand for one minute, a thickness (T'0) of the protective sleeve was measured again under the standard pressure of 4.9 kPa. Each of the obtained thicknesses was introduced into the following formula so as to determine the compressive modulus (Ce). The compressive modulus was measured five times and an average of them was calculated and rounded to an integer.

Ce=[(T'−T1)/(T0−T1)]×100 where Ce denotes compressive modulus (in %), T0 denotes a thickness under the standard pressure (in mm), T1 denotes a thickness under the constant pressure after the protective sleeve was allowed to stand for one minute under the constant pressure (in mm) and T'0 denotes a thickness under the standard pressure after the constant pressure was released and the protective sleeve was allowed to stand for one minute (in mm).

(4) Weight percentage of mixed multifilament strand and monofilament strand: a weight of a protective sleeve for a motor component that has been cut into a length of 10 cm was measured accurately. Thereafter, the protective sleeve was cut so as to separate the monofilament strand therefrom, and a weight of the same was measured. By subtracting the weight of the monofilament strand from the weight of the protective sleeve, a weight of the multifilament strand was calculated. From the thus obtained weights of the multifilament strand and the monofilament strand, weight percentages of the mixed multifilament strand and the monofilament strand were calculated.

(5) Weight of a protective sleeve for a motor component per meter: a protective sleeve for a motor component that has been allowed to stand for 24 hours in a standard state (temperature 20±2° C., relative humidity 65±2%) was cut into a length of 50 cm. A weight of the same was measured and was doubled so as to obtain a weight of the protective sleeve per meter.

EXAMPLE 1

Two multifilament strands (440 dtex, 100 filaments, 190 type) made of PPS fibers (made by Toray Industries, Inc., "Torcon" (trade name), melting point or decomposition temperatures=285° C.) were pulled parallel and were wound on twenty-eight small bobbins.

Separately, a monofilament strand (diameter=0.25 mm) made of a PPS fiber (made by Toray Monofilament Co., Ltd., melting point or decomposition temperature=285° C.) was wound on twenty-eight small bobbins.

Figure 2:
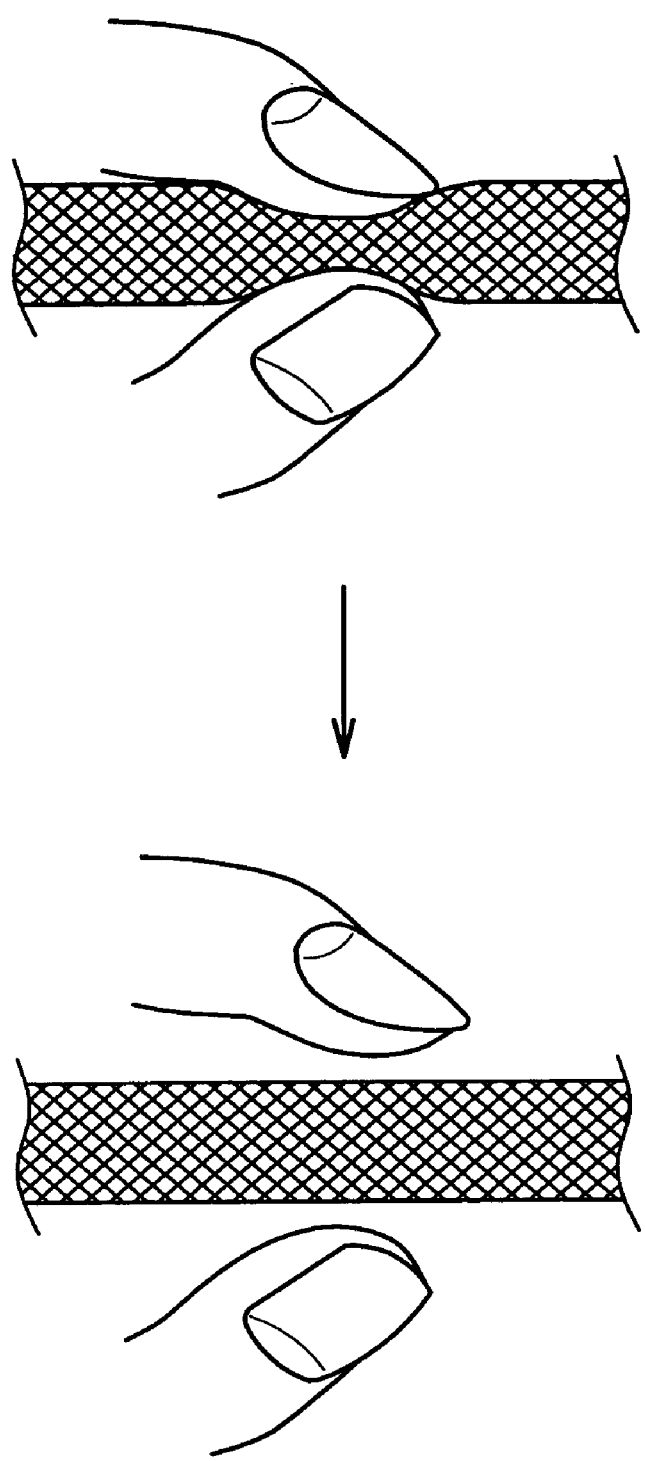
FIG. 2 shows the appearance of the protective sleeve for a motor component that is obtained in Example 1 of the present invention, which shows a state of the protective sleeve held by fingers and a released state of the same.

They were mounted alternately on a 56-strand braider for round cord so as to form a braided cord, immediately followed by sticking the protecting sleeve continuously with a rod-shaped jig so as to obtain a cylindrical shape, whereby a protective sleeve for a motor component was obtained. The protective sleeve had elasticity and maintained a tube form with a diameter of about 9.1 mm. The compressive modulus of the protective sleeve was 82%. FIG. 1 shows the appearance of the obtained protective sleeve for a motor component as one example. FIG. 2 shows the protective sleeve in a state held by fingers and in another state showing that the protective sleeve can recover to the original state after the fingers were removed.

Oil resistance at high temperatures of this protective sleeve was 74.1%. A mixed ratio (weight) of the multifilament strand (A) and the monofilament strand (B) was A:B=40:60. A weight of the protective sleeve per meter was 5.1 g.

A coil (coil for connecting a motor for an electric vehicle with a power source) was able to be inserted extremely easily into the protective sleeve that has been cut into a length of about 10 to 40 cm without the need of a special jig. Thereafter, the protective sleeve with the coil inserted therein was bound by a binding cord and varnish was applied to the protective sleeve. In the varnish treatment, the varnish could penetrate favorably and had favorable durability, and an insulating capability of the same had excellent evenness. The varnish treatment was carried out by dropping an amide-imide ester base non-solvent type impregnation varnish into the protective sleeve so as to penetrate therein, followed by drying and curing.

EXAMPLE 2

Four multifilament strands (220 dtex, 100 filaments, 430 type) made of meta-aramid fibers (made by Dupon, "Nomex" (trade name), melting point or decomposition temperature=371° C.) were pulled parallel and were wound on twenty-eight small bobbins.

Separately, a monofilament strand (diameter=0.25 mm) made of a PPS fiber (made by Toray Monofilament Co., Ltd., melting point or decomposition temperature=285° C.) was wound on twenty-eight small bobbins.

They were mounted alternately on a 56-strand braider for round cord so as to form a braided cord, immediately followed by sticking the protective sleeve continuously with a rod-shaped jig so as to obtain a cylindrical shape, whereby a protective sleeve for a motor component was obtained. The protective sleeve had elasticity and maintained a tube form with a diameter of about 9.0 mm. Compressive modulus of the protective sleeve was 88%.

Oil resistance at high temperatures of this protective sleeve was 86.5%. A mixed ratio (weight) of the multifilament strand (A) and the monofilament strand (B) was A:B=45:55. A weight of the protective sleeve per meter was 5.3 g.

When a coil was inserted into this protective sleeve in the same manner as in Example 1, the coil was able to be inserted extremely favorably into the protective sleeve without the need of a special jig. In the following varnish treatment, the varnish could penetrate favorably and had favorable durability, and an insulating capability of the same had excellent evenness. The varnish treatment was carried out by dropping an amide-imide ester base non-solvent type impregnation varnish into the protective sleeve so as to penetrate therein, followed by curing.

EXAMPLE 3

Two multifilament strands (440 dtex, 100 filaments, 190 type) made of PPS fibers (made by Toray Industries, Inc., "Torcon" (trade name), melting point or decomposition temperatures=285° C.) were pulled parallel and were wound on twenty small bobbins.

Separately, a monofilament strand (diameter=0.25 mm) made of a PPS fiber (made by Toray Monofilament Co., Ltd., melting point or decomposition temperature=285° C.) was wound on thirty-six small bobbins.

They were mounted alternately on a 56-strand braider for round cord so as to form a braided cord, immediately followed by sticking the protective sleeve continuously with a rod-shaped jig so as to obtain a cylindrical shape, whereby a protective sleeve for a motor component was obtained. The protective sleeve had elasticity and maintained a tube form with a diameter of about 9.0 mm. Compressive modulus of the protective sleeve was 93%.

Oil resistance at high temperature of this protective sleeve was 74.1%. A mixed ratio (weight) of the multifilament strand (A) and the monofilament strand (B) was A:B=27:73. A weight of the protective sleeve per meter was 5.4 g.

When a coil was inserted into this protective sleeve in the same manner as in Example 1, the coil was able to be inserted extremely favorably into the protective sleeve without the need of a special jig. Thereafter, when varnish treatment was carried out in the same manner as in Example 1, the varnish could penetrate into the protective sleeve favorably and could be maintained favorably, and an insulating capability of the same had excellent evenness.

EXAMPLE 4

Two multifilament strands (440 dtex, 100 filaments, 190 type) made of PPS fibers (made by Toray Industries, Inc., "Torcon" (trade name), melting point or decomposition temperature=285° C.) were pulled parallel and were wound on forty-two small bobbins.

Separately, a monofilament strand (diameter=0.25 mm) made of a PPS fiber (made by Toray Monofilament Co., Ltd., melting point or decomposition temperature=285° C.) was wound on fourteen small bobbins.

They were mounted alternately on a 56-strand braider for round cord so as to form a braided cord, immediately followed by sticking the protective sleeve continuously with a rod-shaped jig so as to obtain a cylindrical shape whereby a protective sleeve for a motor component was obtained. The protective sleeve had elasticity and maintained a tube form with a diameter of about 9 mm. Compressive modulus of the protective sleeve was 67%.

Oil resistance at high temperature of this protective sleeve was 74.1%. A mixed ratio (weight) of the multifilament strand (A) and the monofilament strand (B) was A:B=54:46. A weight of the protective sleeve per meter was 5.7 g.

When this protective sleeve was incorporated into an electric vehicle motor in the same manner as in Example 1, the coil was able to be inserted extremely favorably into the protective sleeve without the need of a special jig. Thereafter, when varnish was applied in the same manner as in Example 1, the varnish could penetrate into the protective sleeve favorably and could be maintained favorably, and an insulating capability of the same had excellent evenness.

EXAMPLE 5

A protective sleeve for a motor component was obtained in the same manner as in Example 1 except that two multifilament strands were pulled parallel and were wound on sixteen small bobbins, and a monofilament strand was wound on sixteen small bobbins, which were mounted on a 32-strand braider for round cord. The protective sleeve had elasticity and maintained a tube form with a diameter of about 6.75 mm. Compressive modulus of the protective sleeve was 80%.

Oil resistance at high temperatures of this protective sleeve was 74.2%. A mixed ratio (weight) of the multifilament strand (A) and the monofilament strand (B) was A:B=40:60. A weight of the protective sleeve per meter was 2.9 g.

When this protective sleeve was incorporated into an electric vehicle motor in the same manner as in Example 1, the coil was able to be inserted extremely favorably into the protective sleeve without the need of a special jig. Thereafter, when varnish was applied in the same manner as in Example 1, the varnish could penetrate into the protective sleeve favorably and could be maintained favorably, and an insulating capability of the same had excellent evenness.

COMPARATIVE EXAMPLE 1

The same monofilament strand as that of Example 1 was wound on fifty-six small bobbins. These bobbins were mounted on a 56-strand braider for round cord so as to braid a cord, whereby a protective sleeve for a motor component was obtained. With respect to this protective sleeve, a sticking operation was performed in the same manner as in Example 1. Compressive modulus of the obtained protective sleeve was 104%. Oil resistance at high temperatures of this protective sleeve was 75.1% A mixed ratio (weight) of the multifilament strand (A) and the monofilament strand (B) of this protective sleeve was A:B=0:100. A weight of the protective sleeve per meter was 6.1 g. This protective sleeve had a tube form with a diameter of about 8.0 mm. Thereafter, when a varnish treatment was carried out in the same manner as in Example 1, the varnish could not be applied to the protective sleeve with sufficient evenness, and the evenness of an insulating capability of the protective sleeve was insufficient.

Similarly to Example 1, a coil was inserted into this protective sleeve. An insertion capability of the coil into this protective sleeve was better than the following comparative example 2, but a tip of the coil stuck out part way through the operation, so that this protective sleeve was not satisfactory in terms of the efficiency for the work.

COMPARATIVE EXAMPLE 2

The same multifilament strand as that of Example 1 was wound on fifty-six small bobbins. These bobbins were mounted on a 56-strand braider for round cord so as to braid a cord, whereby a protective sleeve for a motor component was obtained. With respect to this protective sleeve, a sticking operation was performed in the same manner as in Example 1. Compressive modulus of the obtained protective sleeve was 58%. Oil resistance at high temperature of this protective sleeve was 74.3%. A mixed ratio (weight) of the multifilament strand (A) and the monofilament strand (B) of this protective sleeve was A:B=100:0. A weight of the protective sleeve per meter was 4.2 g. This tube-form protective sleeve was crushed to have an oblate form, and therefore it was impossible to insert the coil similar to Example 1 into this protective sleeve in this state. Therefore, a tapering cap that was capable of holding an end of the coil on its rear side had to be attached to a tip end of the coil and then such a coil had to be inserted slowly into the protective sleeve. Thus, the workability of the insertion operation of the coil into the protective sleeve was not good. In addition, when a varnish treatment was carried out in the same manner as in Example 1, the varnish was applied to the protective sleeve with slightly insufficient evenness, and the evenness of an insulating capability of the same was not satisfactory.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A protective sleeve for a motor component, comprising a cylindrical-shaped braided cord of twenty-four or more strands using together a multifilament strand and a monofilament strand as braid formation strands made of synthetic fibers having a melting point or a decomposition temperature at 280° C. or more, wherein the protective sleeve has oil resistance at high temperatures of 50% or more, the oil resistance at high temperatures being represented by the following formula:

oil resistance at high temperatures (%)=(T'/T)×100 where T denotes a tensile strength of the protective sleeve before a treatment and T' denotes a tensile strength of the protective sleeve after the treatment, wherein the tensile strength is measured in accordance with JIS L1013-8.5.1, and the treatment is carried out in such a manner that the entire protective sleeve is put into a closed container containing a mixture of 5 weight % of water and 95 weight % of automatic transmission fluid, followed by heating the container so that a temperature of the mixture is maintained at 150° C. for 1,000 hours.

2. The protective sleeve for a motor component according to claim 1, wherein compressive modulus of the protective sleeve measured in accordance with JIS L 1096 ranges from 65% to 95%, inclusive.

3. The protective sleeve for a motor component according to claim 1, wherein the synthetic fibers for the multifilament strand having a melting point or a decomposition temperature at 280° C. or more are a polyphenylene sulfide fiber or an aramid fiber.

4. The protective sleeve for a motor component according to claim 1, wherein the synthetic fiber for the monofilament strand having a melting point or a decomposition temperature at 280° C. or more is a polyphenylene sulfide fiber or an aramid fiber.

5. The protective sleeve for a motor component according to claim 1, wherein the protective sleeve further is subjected to a treatment of sticking the protective sleeve continuously with a rod-shaped jig so as to assume the cylindrical shape.

6. The protective sleeve for a motor component according to claim 1, wherein a thickness of the multifilament strand ranges from 150 dtex to 900 dtex, inclusive.

7. The protective sleeve for a motor component according to claim 1, wherein a thickness of the monofilament strand ranges from 0.1 mm to 0.5 mm, inclusive, in diameter.

8. The protective sleeve for a motor component according to claim 1, wherein a weight of the protective sleeve per meter ranges from 2.0 g to 10.0 g, inclusive.

9. The protective sleeve for a motor component according to claim 1, wherein the cord is braided so that the multifilament strand (A) and the monofilament strand (B) are used together at a weight ratio of (A):(B)=20:80 to 80:20.

10. The protective sleeve for a motor component according to claim 1, wherein the cord is braided using together the multifilament strand and the monofilament strand that are supplied separately.

11. The protective sleeve for a motor component according to claim 1, wherein the protective sleeve further is subjected to a varnish treatment.

12. A protective sleeve for a motor component, comprising a cylindrical-shaped braided cord of twenty-four or more strands using together a multifilament strand and a monofilament strand as braid formation strands, the multifilament strand being of 150 dtex to 900 dtex, inclusive, and made of synthetic fibers having a melting point or a decomposition temperature of 280° C. or more, and the monofilament strand being of 0.1 mm to 0.5 mm, inclusive, in diameter and made of a synthetic fiber having a melting point or a decomposition temperature of 280° C. or more, which are used together at a weight ratio of 20:80 to 80:20, wherein the protective sleeve is subjected to a treatment of sticking the protective sleeve continuously with a rod-shaped jig so as to assume the cylindrical shape.

13. A protective sleeve for a motor component, comprising a cylindrical-shape braided cord of forty-eight to sixty-four strands, inclusive, using together a multifilament strand and a monofilament strand as braid formation strands, the multifilament strand being of 150 dtex to 900 dtex, inclusive, and made of synthetic fibers having a melting point or a decomposition temperature of 280° C. or more, and the monofilament strand being of 0.1 mm to 0.5 mm, inclusive, in diameter and made of a synthetic fiber having a melting point or a decomposition temperature of 280° C., or more, which are used together at a weight ratio of 20:80 to 80:20, wherein the protective sleeve is subjected to a treatment of sticking the protective sleeve continuously with a rod-shaped jig so as to assume the cylindrical shape.

14. The protective sleeve for a motor component according to claim 12, wherein the protective sleeve further is subjected to a varnish treatment.

15. The protective sleeve for a motor component according to claim 13, wherein the protective sleeve further is subjected to a varnish treatment.

* * * * *